United States Patent
Morton

[11] 4,084,037
[45] Apr. 11, 1978

[54] CONSTANT POLARITY BATTERY-CONNECTION SYSTEM

[75] Inventor: David H. Morton, Upton, Mass.

[73] Assignee: American Optical Corporation, Southbridge, Mass.

[21] Appl. No.: 783,588

[22] Filed: Apr. 1, 1977

[51] Int. Cl.² .................................. H01M 2/20
[52] U.S. Cl. .................................. 429/1; 325/118
[58] Field of Search ............ 429/1, 161, 121, 123, 429/158, 160, 97, 98, 99, 100; 325/118

[56] References Cited

U.S. PATENT DOCUMENTS

| 3,339,169 | 8/1967 | Freeland | 429/121 |
| 3,855,534 | 12/1974 | Holcomb | 429/98 |

Primary Examiner—John H. Mack
Assistant Examiner—H. A. Feeley
Attorney, Agent, or Firm—Jeremiah J. Duggan; Stephen A. Schneeberger

[57] ABSTRACT

A battery-connection system for a battery having a pair of battery terminals of opposite polarity and positionable in either of two reversed positionings relative to distribution means. The distribution means includes a pair of spaced electrical terminals of particular and opposite polarity electrically connected with a unit to be powered. A carrier interpositioned between the battery and distribution means including a first pair of electrical contacts in singularly-polarized electrical contacting engagement with the respective battery terminals and a second pair of spaced electrical contacts electrically connected with respective ones of the first pair of contacts for singularly-polarized electrical contacting engagement with the respective pair of distribution means terminals. Each contact of the carrier second pair is of opposite polarity to the other, and comprises a set of plural alternate contacts of the same polarity. These alternate contacts of each set are relatively positioned such that the polarity of the connection between the battery terminals and the pair of distribution means terminals is constant for either of the reversed positionings of the battery.

Where the battery includes a pair of differently-keyed battery terminals for establishing polarity, the first contacts on the carrier are similarly keyed for the correct mating engagement with the battery terminals and may be structured to mechanically join the carrier with the battery.

13 Claims, 7 Drawing Figures

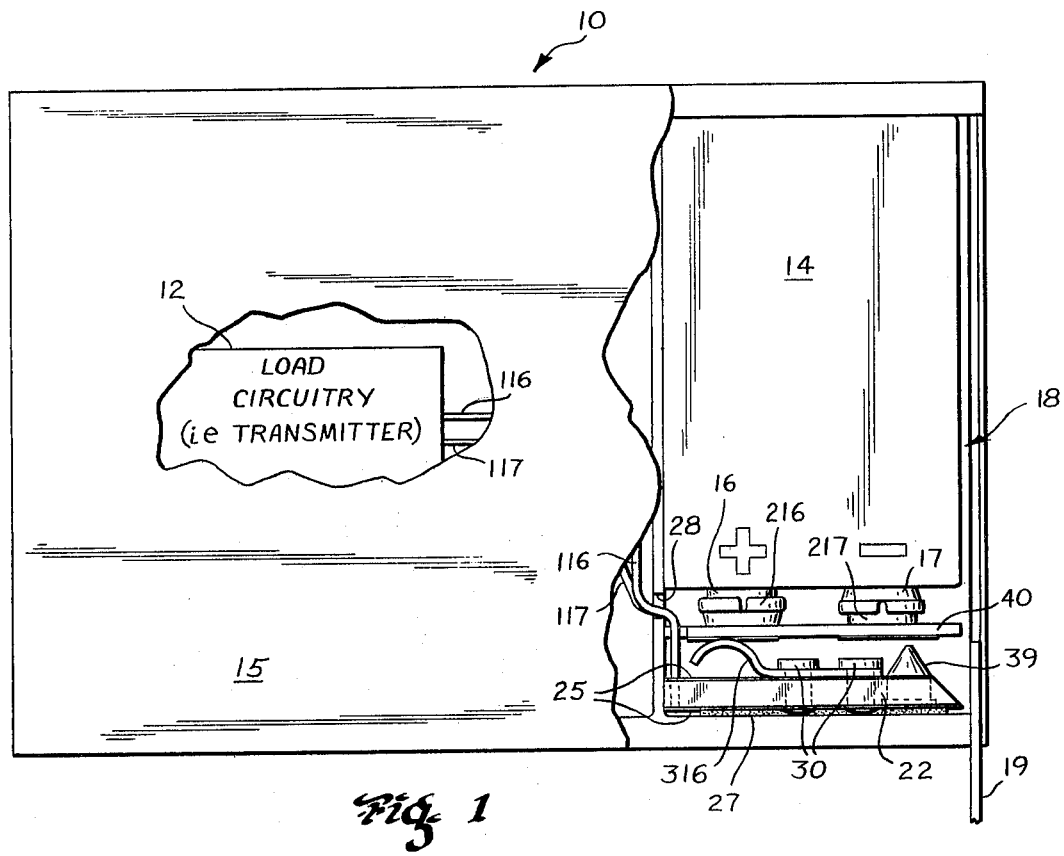
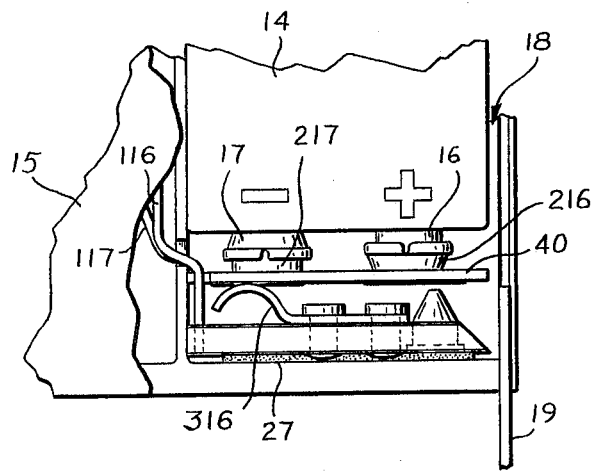
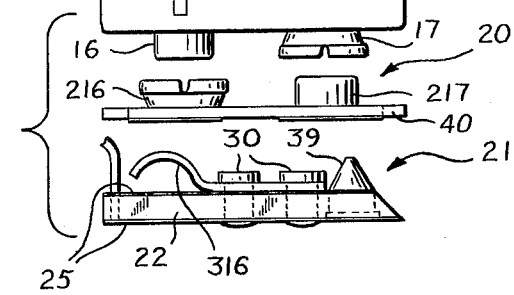

CONSTANT POLARITY BATTERY-CONNECTION SYSTEM

BACKGROUND OF THE INVENTION

The invention relates generally to battery-connection systems and more specifically to battery-connection systems which provide for a constant-polarity connection between the battery and the circuitry to be powered.

A variety of connection systems have been utilized for connecting batteries of various configurations with the circuitry or unit to be powered. One area of particular interest involves the compact housing and connection of small batteries with various types of electronic circuits, such as transistorized radios, telemetry units, and the like. In these various applications, the circuitry to be powered normally provides a pair of conductive leads for connection with the battery in accordance with the predetermined opposite polarities of the respective conductors of the pair. As used herein, the phrase "opposite polarities" refers generally to two different electrical potentials, whether plus and minus; ground and plus; or ground and minus. In some of the applications requiring that the battery potential be applied to the utilization circuitry in a singular, particular polarity, an arrangement of protection diodes may be provided to insure that the reverse polarity is not applied to the circuitry by virtue of an improper connection of the conductive leads with the battery. While providing an ample safeguard, such protection diodes represent an additional expense and prevent operation of the circuitry unless the correct polarity of the battery relative to the circuitry is established.

In the more typical case, the battery terminals and/or the connection system are so configured that reversal of polarity in the connection with the electronic circuitry is prevented. For instance, in those situations in which a cylindrical or wafer-like battery may be used, the battery terminals might assume a concentric arrangement affording correct-polarity connection at substantially any angular orientation. However, if the battery assumes a well-known rectilinear shape in which the battery terminals are non-concentrically spaced from one another at one end of the battery, the respective connection terminals must be applied to the battery terminals in a correct relationship. Usually the correct-polarity connection is assured by one-way keying the physical geometry of the battery terminals to their respective mating connection contacts.

Because of the need to key the battery terminal connections and the further need for good electrical contacts, it is usual for the terminal connectors to be at the end of flexible conductors or wires to facilitate their connection to the battery terminals and to facilitate seating of the battery within its storage compartment.

However, while affording a certain convenience, such flexible and/or extensible conductors may also exhibit a shortcoming in that repeated movements and/or flexure may result in a break in the conductive path, as by metal fatigue or the like. While the potentials for this problem may not be particularly great in some applications such as transistorized radios in which batteries are replaced relative infrequently, it may be a substantially greater problem in applications such as telemetry in which batter replacement is relatively frequent.

Accordingly, it is the principal object of the present invention to provide a battery-connection system which facilitates the attainment of a correctly polarized electrical connection between the battery and utilization circuit while minimizing the strain and/or wear on conductive leads during battery placement and replacement.

These and other objects of the invention will be, in part, obvious and, in part, pointed out in greater detail hereinafter.

SUMMARY OF THE INVENTION

In accordance with the present invention, there is provided a battery-connection system which insures correct polarity connection with a utilization circuit in a facile manner which minimizes or eliminates movement of extensible or flexible conductive leads. A battery-connection system wherein the battery to be connected is positionable in either of two reversed positionings relative to a distribution member and has a pair of battery terminals of opposite polarity similarly reversed in the two reversed positionings, respectively, comprises a distribution member which includes a pair of spaced electrical terminals of particular, opposite polarity electrically connected with a unit to be powered; and a carrier member including a first pair of spaced electrical contacts for singularly polarized, electrically conductive, contacting engagement with the respective battery terminals, and a second pair of spaced electrical contacts electrically connected with the first pair of contacts respectively for singularly-polarized electrical contacting engagement with the distribution terminals respectively. Each contact of the second pair of contacts is of opposite polarity to the other and comprises a set of plural alternate contacts of the same polarity. The alternate contacts of each set are relatively positioned such that the polarity of the connection between the battery terminals and the distribution terminals is constant for either of the two reversed positionings of the battery relative to the distribution member.

The distribution member is normally in substantially constant positional relation with the unit to be battery-powered thereby to minimize movement of the conductive leads therebetween.

The carrier member may conveniently be a printed circuit board or the like having the first set of contacts in the form of connectors operatively disposed on one surface thereof and having the second set of contacts in the form of printed circuitry on at least one side, preferably the opposite, thereof for selective engagement with the distribution board terminals.

In the instance in which the battery includes a pair of differently-keyed battery terminals for establishing polarity, the first contacts on the carrier member are similarly appropriately keyed for the correct mating engagement with the battery terminals. More particularly, the battery terminals and the first pair of electrical contacts on the carrier member are preferably structured for interlocking connection thereby to mechanically join the carrier member with the battery for facilitating battery replacement.

The invention is particularly suited for use with rectilinearly shaped batteries and includes battery-holding means having a battery compartment therein for receiving the battery. The distribution member is affixed to one end of the battery compartment to form an end wall thereof and the opposite end of the compartment is positioned to urge the battery, the carrier member, and the distribution member into mutual operative engagement. The battery-holding means is configured to accommodate sliding access of the battery into the battery compartment through one side of the battery compartment.

The terminals of the distribution member are a pair of spring-contacts for biased engagement with a respective opposite-polarity pair of the plural alternate contacts of the second pair of contacts.

BRIEF DESCRIPTION OF THE DRAWINGS

FIG. 1 illustrates a side assembly view, partly broken away and partly in section, of a telemetry transmitter unit including a battery and the novel battery-connection system of the invention;

FIG. 2 is a fragmentary view of FIG. 1 showing the battery terminals reversed relative to their positioning in FIG. 1;

FIG. 3 is an exploded view of the elements comprising the novel battery-connection system illustrated in FIG. 1;

DESCRIPTION OF THE PREFERRED EMBODIMENT

Figure 4:
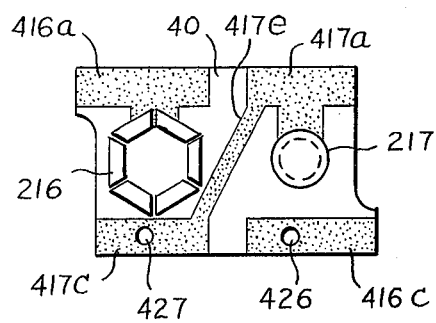
FIG. 4 is a plan view of the carrier-board assembly for the battery-connection system, as viewed from the battery.

Referring now to the Figures and particularly FIG. 1, the battery-connection system of the invention is illustrated in a telemetry transmitter 10, such as might be used in hospitals for transmitting data from a patient to a remote received. Such transmitters typically include transmitter electronics, herein generally identified as "load circuitry" 12, an antenna (not shown), and a battery 14 which serves as a DC source of power to the load circuitry 12. The battery 14 and load circuitry 12 are conveniently housed within a common case 15. The frequency of battery replacement is relatively high in an application such as a medical telemetry transmitter; however, it will be appreciated that the present battery-connection system will also find utility in other applications, such as radio receivers, and the like requiring battery replacement at various intervals.

The battery 14 is of generally rectilinear shape and includes a positive terminal 16 and a negative terminal 17 at one end thereof. Terminals 16 and 17 are non-concentrically spaced from one another in a conventional manner. The battery terminals 16 and 17 are preferably of respectively different geometries or configurations to further distinguish one from another and to provide for keyed-connection with a mating pair of connector contacts.

Conventionally, a pair of conductive leads, generally represented as 116 and 117, respectively, are connected to load circuitry 12 and are intended for electrical connection with positive and negative battery terminals 16 and 17, respectively. Heretofore, an electrical connector at the end of conductive lead 116 was keyed for connection with only battery terminal 16 and an electrical connector at the end of conductive lead 117 was keyed for connection with only battery terminal 17. For instance, the positive battery terminal 16 may comprise a male member or stud and the negative terminal 17 may comprise a female member or socket. Correspondingly, the electrical connector or contact associated with lead 116 would comprise a female member or socket and the electrical connector or contact associated with lead 117 would comprise a male member or stud.

In the conventional prior art battery-connection system, the male and female connectors are directly connected to the ends of conductive leads 116 and 117, respectively. However, in the present invention, the female connector or contact 216 and the male connector or contact 217 are only indirectly and removably in electrical connection with leads 116 and 117, respectively, as will be hereinafter described. Battery terminals 16 and 17 and the corresponding connector contacts 216 and 217, respectively, are configured for respective removable interlocking engagement.

In the illustrated embodiment, the transmitter case 15 includes a substantially rectilinear battery compartment 18 in one end thereof. The battery compartment 18 includes a removable cover, such as slide panel 19, in at least one side thereof to permit installation and removal of the battery 14. The geometry of compartment 18 is generally such that battery 14 may be installed in either one of two operative positionings, the first being that illustrated in FIG. 1 and the second being that illustrated in FIG. 2 in which the positioning of the battery terminals 16 and 17 within compartment 18 has been reversed.

Because of the relative ease with which battery 14 may be installed in either of the two opposite polarity configurations illustrated in FIGS. 1 and 2, the present battery-connection system is effective to provide correct-polairty battery connection with load circuitry 12 in either configuration. Further, the battery-connection system permits electrical connection of the battery 14 with the load circuitry via conductive leads 116 and 117 without need to extend or otherwise move leads 116 and 117.

Figure 5:
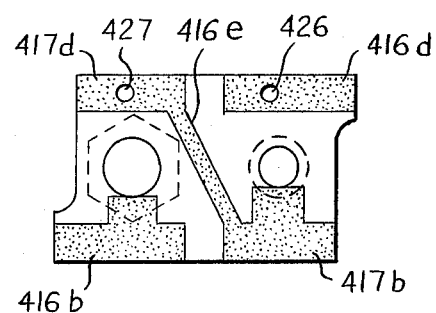
FIG. 5 illustrates an underside view of the carrier-board assembly as viewed from the distribution-board assembly.
Figure 6:
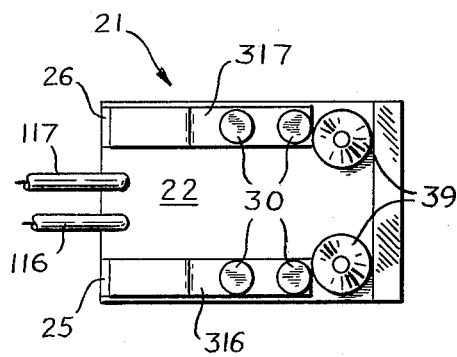
FIG. 6 is a plan view of the distribution-board assembly as viewed from the carrier-board assembly.
Figure 7:
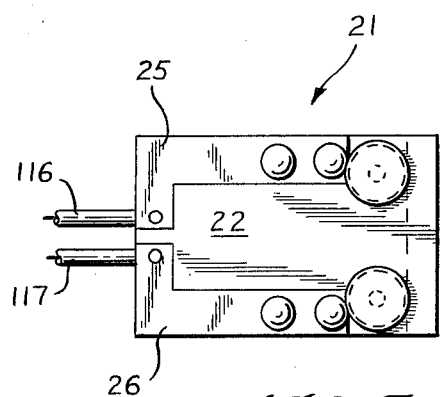
FIG. 7 is an underside view of the distribution-board assembly.

The battery-connection system will be described with particular reference to FIGS. 1 and 3-7, and comprises a carrier assembly 20 and a distribution-board assembly 21. Generally speaking, the ends of conductive leads 116 and 117 remote from the load circuitry 12 are fixedly connected to the distribution-board assembly 21. The carrier-board assembly 20 is in removably interlocking, electrically-conductive relationship with battery 14, and the carrier assembly 20 is removably positionable in electrically-conducting, contacting engagement with the distributor-board assembly 21.

The distribution-board assembly 21 comprises a substantially rigid substrate or board 22 for mounting a pair of electrical contact terminals 316 and 317 which are electrically connected with the ends of conductive leads 116 and 117, respectively, via printed conductors 25 and 26, respectively. The substrate or printed circuit board 22 may be of fiber glass or the like and is of about the same size as one end of the battery compartment 18. The distribution-board 22 is preferably bonded, as with an epoxy bond 27, to one end of the battery compartment 18 to provide for stationary connection of the conductive leads 116 and 117 thereto. Because conductive leads 116 and 117 may then be connected at one end to a substantially fixedly positioned distribution board 22 and are connected at their other end to load circuit 12 which normally does not move relative to the distribution board 22, there should be little or no flexing of the conductive leads which might otherwise eventually result in their failure. The conductive leads 116 and 117 extend from load circuitry 12 to the battery compartment 18 and distribution board 22 through an opening or port 28 in one of the walls which defines the battery compartment 18.

Printed contacts 25 and 26 are, of course, each electrically isolated from one another and may each comprise a conductive coating on either or both the top and bottom surfaces of distribution board 22. Leaf-spring contact terminals 316 and 317 are electrically isolated from one another and are mounted on the upper surface of the distribution board 22 in cantilever fashion, as by conductive eyelets 30 which extend through board 22. The cantilevered portion of spring contact terminals 316 and 317 are parallel to one another and extend inwardly from the opening in case 15 through which battery 14 and carrier 20 are inserted, thereby to facilitate such insertion. Further, the end of distribution board 22 proximate to cover 19 is chamfered to also facilitate introduction of the carrier assembly 20 and battery 14 to the battery compartment 18.

The leaf-spring contact terminals 316 and 317 are configured and positioned such that they make electrical contact with the carrier assembly 20 preferably only when battery 14 is fully or nearly fully inserted within compartment 18. A pair of non-conductive spacers 39 are mounted near the end of the distribution board opposite the leaf-spring contact terminals 316 and 317 to prevent the pair of lower-surface contacts of carrier assembly 20 closest to slide panel 19 from contacting any part of the cantilevered leaf-spring contact terminals 316, 317, and to prevent permanent deformation of terminals 316, 317 in the event transmitter case 15 is dropped.

Referring to the carrier assembly 20, a substantially rigid substrate member or fiber glass board 40 is of substantially the same rectangular shape and size as the distribution board 22 with the exception that the carrier board 40 includes a pair of narrow, longitudinally extending spacer tabs at the diagonally opposite ends thereof. The spacer tabs contact the inner side wall of battery compartment 18 to create a space between the carrier board 40 and the battery compartment wall through which conductive leads 116 and 117 may pass.

As before noted, a female snap-on connector contact 216 and a male snap-on connector contact 217 are mounted on carrier board 40 for releasable, snap-on engagement with the corresponding male and female terminals 16 and 17, respectively, of battery 14. Connector contacts 216 and 217 may be rigidly mounted on board 40 by suitable means and preferably include a conductive portion extending through the board 40 to the opposite surface or undersurface thereof.

The conductive contacts on carrier board 40 for conducting current between connectors 216 and 217 and the respective leaf-spring terminal contacts 316 and 317 are generally designated 416 and 417, respectively. In the illustrated embodiment, the contacts 416 and 417 are comprised of printed circuitry and, accordingly, each comprises a series of conductively interconnected segments at two diagonally opposite corners of board 40 on both the upper and lower surfaces thereof and interconnected by a connecting segment.

The composite contact 416 is thus comprised of an upper surface contact 416a, a corresponding undersurface contact 416b immediately thereunder, another upper surface contact 416c in the diagonally opposite corner, a corresponding undersurface contact 416d immediately under contact 416c, and a connecting conductive strip 416e on the undersurface of board 40 connecting contact segments 416b and 416d.

Segments 416a and 416b preferably both directly contact connector contact 216 such that undersurface contacts 416b and 416d each are of the polarity of connector contact 216. Of course, it will be appreciated the contacts 416c and 416d must be spaced from contact 217 for electrical isolation therefrom. In order that the potential appearing on contact 416d may similarly appear on upper surface contact 416c, a small plated-through hole 426 connects the two conductive surface segments. While in the present embodiment, the operative contact surfaces for alternate engagement with spring contact 316 will be seen to be undersurface contact segments 416b and 416d, the upper surface contact segments 416a and 416c are also provided to permit contact with an alternative form of distribution-board assembly in which the spring contact terminal would be constructed to contact the upper surface of the carrier assembly.

Similarly, the composite contact designated 417 and associated with connector contact 217 comprises an upper surface contact segment 417a at one corner of board 40, an undersurface contact segment 417b immediately therebelow, another upper surface contact segment 417c diagonally opposite segment 417a, a lower surface contact segment 417d immediately below segment 417c, and a connecting segment 417e on the upper surface of board 40 extending between contact segments 417a and 417c. It will be appreciated that connecting segments 416e and 417e are on opposite surfaces of carrier board 40 to maintain their electrical isolation; however, they might both be on the same surface if insulated conductors were used rather than printed circuitry. Similarly, contact segments 417a and 417b are preferably in direct contact with connector 217, and contact segments 417c and 417d are spaced from connector 216 for electrical isolation therefrom. A plated-through hole 427 electrically connects contact segments 417c and 417d.

The various contact segments collectively designated 416 and 417 are configured and spaced so as not to contact and electrically interfere with one another. However, the positioning of those contacts, and particularly the undersurface contacts 416b, 416d, and 417b, 417d are positioned for contact with spring terminal contacts 316 and 317, respectively, in either of the two reversed positionings of battery 14 illustrated in FIGS. 1 and 2.

Because carrier assembly connectors 216 and 217 are designed for interlocking engagement with battery terminals 16 and 17, respectively, the carrier assembly 20 and battery 14 comprise, in essence, an integral unit during battery installation and removal as well as during normal operation of the battery. Distribution-board assembly 21, in effect, comprises one end of battery compartment 18 with the other end of the compartment being spaced so as to urge battery 14, and more specifically the appropriate contact segments of contacts 416 and 417, into spring-biased engagement with spring terminal contacts 316 and 317, respectively.

In view of the foregoing discussion, it will be apparent that battery 14 may be positioned in either of its two readily-reversed positions and yet maintain the appropriate polarity of connection with the load circuitry 12. Further, substantially no flexing or extension of conductive leads 116 and 117 is required, with the only "working" of a conductive member being the flexure of spring terminal contacts 316 and 317.

The invention may be embodied in other specific forms without departing from the spirit or essential characteristics thereof. The present embodiment is, therefore, to be considered in all respects as illustrative and not restrictive, the scope of the invdntion being indicated by the appended claims rather than by the foregoing description, and all changes which come within the meaning and range of equivalency of the claims are, therefore, intended to be embraced therein.

What is claimed is:

1. A battery-connection system for a unit to be powered wherein the battery is positionable in either of two reversed positionings relative to a distribution means and having a pair of battery terminals of opposite polarity similarly reversed in said two reversed positionings respectively, comprising:

a said distribution means including a pair of spaced electrical terminals of particular and opposite polarity electrically connected with a unit to be powered; and a carrier means including a first pair of spaced electrical contacts for singularly-polarized, electrical contacting engagement with said battery terminals respectively, and a second pair of spaced electrical contacts electrically connected with said first pair of contacts respectively for singularly-polarized electrical contacting engagement with said pair of distribution means terminals respectively, each contact of said second pair of contacts being of opposite polarity to the other and comprising a set of plural alternate contacts of the same polarity, the said alternate contacts of each set being relatively positioned such that the polarity of the connection between said battery terminals and said pair of distribution means terminals is constant for either of the two reversed positionings of the battery relative to said distribution means.

2. The battery-connection system of claim 1 wherein the distribution means is normally in substantially constant positional relation with the unit to be powered thereby to minimize movement of the electrical connections extending therebetween.

3. The battery-connection system of claim 1 wherein said carrier means comprises a substantially rigid board having said first and said second pairs of contacts thereon.

4. The battery-connection system of claim 1 wherein each battery terminal of said pair is of a particular keyed-configuration different than the other and said first pair of contacts of said carrier means are similarly keyed for singularly-polarized mating engagement therewith.

5. The battery-connection system of claim 4 wherein the pair of battery terminals of opposite polarity are of male and female configurations, respectively, and the corresponding contacts of said second pair of contacts are of female and male configurations, respectively.

6. The battery-connection system of claim 4 wherein said pair of battery terminals and said first pair of electrical contacts on said carrier means are structured for respective interlocking connection thereby to mechanically join said carrier means with the battery.

7. The battery-connection system of claim 3 wherein said second pair of contacts on said carrier means board comprises printed circuitry.

8. The battery-connection system of claim 7 wherein said first pair of contacts is on one surface of said board and said second pair of electrical contacts is on the opposite surface of said board.

9. The battery-connection system of claim 8 wherein said opposite surface of said carrier means board is generally rectilinearly shaped, each contact of said second pair of contacts comprises two alternate contacts of the same polarity, the alternate contacts of each particular polarity being diagonally opposite one another on said opposite surface of the board.

10. The battery-connection system of claim 1 wherein the battery is of generally rectilinearly-shaped geometry and said battery terminals are on one end of the battery in non-concentric relationship with one another.

11. The battery-connection system of claim 10 including battery-holding means having a battery compartment therein, said distribution means being fixedly positioned at one end of said battery compartment to comprise one end wall thereof, the opposite end wall of said battery compartment being positioned to urge the battery and said carrier means and said distribution means into mutual operative engagement.

12. The battery-connection system of claim 11 wherein said distribution means terminals comprise a pair of spring-contacts for biased engagement with a respective pair of the alternate contacts of said second pair of contacts.

13. The battery-connection system of claim 12 wherein said battery-holding means is configured to accommodate sliding access of the battery to the battery compartment through one side of the battery compartment.

* * * * *